(12) United States Patent
Shiohara

(10) Patent No.: US 7,463,381 B2
(45) Date of Patent: Dec. 9, 2008

(54) MARKUP LANGUAGE EDIT METHOD, RECORD MEDIUM RECORDING BROWSER, AND PRINT SYSTEM

(75) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 221 days.

(21) Appl. No.: 11/498,789

(22) Filed: Aug. 4, 2006

(65) Prior Publication Data

US 2006/0290982 A1    Dec. 28, 2006

Related U.S. Application Data

(63) Continuation of application No. 10/082,346, filed on Feb. 26, 2002, now abandoned.

(30) Foreign Application Priority Data

Feb. 26, 2001    (JP)    ............... P2001-050044

(51) Int. Cl.
  *G06F 3/12* (2006.01)
  *G06K 1/00* (2006.01)
(52) U.S. Cl. .................... 358/1.15; 358/1.13
(58) Field of Classification Search .......... 358/1.1, 358/1.2, 1.6, 1.9, 1.11, 1.13, 1.14, 1.15, 1.16, 358/1.17, 1.18, 407, 468; 715/205, 206, 715/207, 208, 234, 235, 236, 237, 239, 760
See application file for complete search history.

(56) References Cited

U.S. PATENT DOCUMENTS

| | | |
|---|---|---|
| 6,573,927 B2 | 6/2003 | Parulski et al. |
| 6,715,003 B1 | 3/2004 | Safai |
| 6,784,924 B2 | 8/2004 | Ward et al. |
| 6,985,248 B2 | 1/2006 | Parulski et al. |
| 7,034,871 B2 | 4/2006 | Parulski et al. |
| 7,057,648 B2 | 6/2006 | Parulski et al. |
| 7,210,161 B2 | 4/2007 | Ward et al. |
| 7,256,823 B2 | 8/2007 | Ward et al. |
| 2003/0014416 A1 | 1/2003 | Kimbell et al. |
| 2005/0052469 A1 | 3/2005 | Crosby et al. |
| 2005/0120655 A1 | 6/2005 | Wolff et al. |
| 2005/0144256 A1 | 6/2005 | Blumberg |
| 2005/0146612 A1 | 7/2005 | Ward et al. |
| 2005/0146746 A1 | 7/2005 | Parulski et al. |
| 2005/0243189 A1 | 11/2005 | Parulski et al. |
| 2005/0254089 A1 | 11/2005 | Oliver et al. |
| 2006/0077278 A1 | 4/2006 | Parulski et al. |
| 2006/0268123 A1 | 11/2006 | Ward et al. |

(Continued)

FOREIGN PATENT DOCUMENTS

JP    10-108006 A    4/1998

(Continued)

*Primary Examiner*—Dov Popovici
(74) *Attorney, Agent, or Firm*—Sughrue Mion, PLLC

(57) ABSTRACT

To display an HTML document on a display (51), a browser interprets only display tags and ignores print tags. To interpret the tags and display the HTML document, the browser transmits a request for transferring four image files (A1, B1, C1, and D1) to a WWW server (40) and displays the image files on the display (51). When the user clicks on a print button displayed on the display (51) by the browser, the browser interprets tags used for print, transmits a request for transferring four image files (A2, B2, C2, and D2) to the WWW server (40), and prints the four image files on a printer (80).

14 Claims, 6 Drawing Sheets

U.S. PATENT DOCUMENTS

2007/0285523 A1  12/2007  Ward et al.

FOREIGN PATENT DOCUMENTS

| JP | 10-304292 A | 11/1998 |
| JP | 2000-076036 A | 3/2000 |
| JP | 2001-24927 A | 1/2001 |
| JP | 2001-53916 A | 2/2001 |
| JP | 2001-265688 A | 9/2001 |
| JP | 2002-132758 A | 5/2002 |
| WO | 97/50243 A1 | 12/1997 |

FIG. 8

```
<HTML>
<BODY>
<print_paper_size=A4,rotate>
<CENTER>
<TABLE BORDER=1 BGCOLOR="#FFFFF" WIDHT=2500>
    <TR>
        <TD>
            <img SRC=(DSP="photoA1.jpg",PRN="photoA2")>
        </TD>
        <TD>
            <img SRC=(DSP="photoB1.jpg",PRN="photoB2")>
        </TD>
    </TR>
    <TR>
        <TD>
            <img SRC=(DSP="photoC1.jpg",PRN="photoC2")>
        </TD>
        <TD>
            <img SRC=(DSP="photoD1.jpg",PRN="photoD2")>
        </TD>
    </TR>
</TABLE>
</CENTER>
</BODY>
</HTML>
```

FIG. 9

```
<HTML>
<BODY>
<print_paper_size=A4,rotate>
<CENTER>
<TABLE BORDER=1 BGCOLOR="#FFFFF" WIDHT=2500>
    <TR>
        <TD>
            <img SRC="photoA.jpg"(DSP=16%,PRN=100%)>
        </TD>
        <TD>
            <img SRC="photoB.jpg"(DSP=16%,PRN=100%)>
        </TD>
    </TR>
    <TR>
        <TD>
            <img SRC="photoC.jpg"(DSP=16%,PRN=100%)>
        </TD>
        <TD>
            <img SRC="photoD.jpg"(DSP=16%,PRN=100%)>
        </TD>
    </TR>
</TABLE>
</CENTER>
</BODY>
</HTML>
```

FIG. 10

```
<HTML>
<BODY>
<print_paper_size=A4,rotate>
<CENTER>
<TABLE BORDER=1 BGCOLOR="#FFFFF" WIDHT=2500>
  <TR>
    <TD>
      <img SRC=(DSP="photoA1.jpg",PRN="photoA2")>
    </TD>
    <TD>
      <img SRC=(DSP="photoB1.jpg",PRN="photoB2")>
    </TD>
  </TR>
  <TR>
    <TD>
      <img SRC=(DSP="photoC1.jpg",PRN="photoC2")>
    </TD>
    <TD>
      <img SRC=(DSP="photoD1.jpg",PRN="photoD2")>
    </TD>
  </TR>
</TABLE>
</CENTER>

<SHEET FEED>

<CENTER>
<TABLE BORDER=1 BGCOLOR="#FFFFF" WIDHT=2500>
  <TR>
    <TD>
      <img SRC=(DSP="photoE1.jpg",PRN="photoE2")>
    </TD>
    <TD>
      <img SRC=(DSP="photoF1.jpg",PRN="photoF2")>
    </TD>
  </TR>
  <TR>
    <TD>
      <img SRC=(DSP="photoG1.jpg",PRN="photoG2")>
    </TD>
    <TD>
      <img SRC=(DSP="photoH1.jpg",PRN="photoH2")>
    </TD>
  </TR>
</TABLE>
</CENTER>

</BODY>
</HTML>
```

MARKUP LANGUAGE EDIT METHOD, RECORD MEDIUM RECORDING BROWSER, AND PRINT SYSTEM

CROSS-REFERENCE TO RELATED APPLICATION

This application is a continuation of U.S. application Ser. No. 10/082,346 filed Feb. 26, 2002, now abandoned the disclosure of which is incorporated herein by reference in its entirety.

BACKGROUND OF THE INVENTION

This invention relates to a method, program and a digital still camera capable of editing a markup language, and a markup language interpretation method to interpret a markup language and print an image, a browser, and a print system.

In recent years, an environment in which anyone can easily access a document stored in a WWW (World Wide Web) server, for example, an HTML (Hypertext Markup Language) document has been almost completed with widespread use of the Internet, and it can be said that the Internet establishes a place as one of infrastructures. Since the document stored in the WWW server can be accessed at any time instantaneously from anywhere in the world regardless of the place or time, the WWW is useful not only as means for disseminating information to others, but also as means for recording personal information for the person.

The documents transmitted and received in the WWW, such as HTML documents, generally are prepared assuming that they have low resolution and the image provided when such a document is printed is of low image quality.

For the documents transmitted and received in the WWW, such as HTML documents, generally the document layout at the output time is not clearly defined and the document layout is determined at the output time in response to setting of a display, a printer, etc.

To record an image captured by a digital still camera, etc., and print the image at high image quality in a WWW client, the following problems are involved in the background environments:

First, although even image data of high image quality sufficient for viewing on a display cannot be said to be of high image quality for printing and viewing, the displayed image cannot be printed based on image data with higher resolution than the display resolution.

Second, although the documents transmitted and received in the WWW, such as HTML documents, have been easy to prepare in recent years owing to development of edit application programs, it cannot be said that anybody can easily prepare the documents transmitted and received in the WWW, and it is not easy for everyone to record an image captured by a digital still camera, etc., in a WWW server.

Third, with the documents transmitted and received in the WWW in which the document layout at the time of output is not clearly defined, it is difficult to print a fixed-layout document in a WWW client; for example, it is not easy to print images recorded in a WWW server in a specific album form at all times in a WWW client.

SUMMARY OF THE INVENTION

It is therefore an object of the invention to provide a markup language edit method, a record medium recording a markup language edit program, a digital still camera, a markup language interpretation method, a record medium recording a browser, a print system, and a server computer for making it possible to solve the problems as described above and improve the convenience of recording and printing an image using a telecommunication line.

In order to solve the aforesaid object, the invention is characterized by having the following arrangement.

(1) A method of editing a markup language comprising the steps of:

describing, in a document transferred to a client computer through a telecommunication line from a server computer, a first embedded command interpreted when the document is displayed by the client computer, the first embedded command causing the client computer to display first image data of an input image;

describing in the document a second embedded command interpreted when the document is printed by the client computer, the second embedded command causing the client computer to print second image data of the input image with a larger number of pixels than the number of pixels of the first image data of the input image; and outputting the document with the first and second embedded commands described.

(2) The markup language edit method according to (1) further comprising the step of describing in the document a third embedded command interpreted when the document is printed by the client computer, the third embedded command specifying a document layout.

(3) The markup language edit method according to (2) further comprising the step of describing in the document a fourth embedded command interpreted when the document is printed by the client computer, the fourth embedded command specifying a page break.

(4) A record medium storing a markup language edit program for causing a computer to execute the steps of:

describing, in a document transferred to a client computer through a telecommunication line from a server computer, a first embedded command interpreted when the document is displayed by the client computer, the first embedded command causing the client computer to display first image data of an input image;

describing in the document a second embedded command interpreted when the document is printed by the client computer, the second embedded command for printing second image data of the input image with a larger number of pixels than the number of pixels of the first image data of the input image; and outputting the document with the first and second embedded commands described.

(5) A digital still camera comprising:

an image data output unit for outputting image data from an input image; and a markup language output unit for describing, in a document transferred to a client computer through a telecommunication line from a server computer, a first embedded command interpreted when the document is displayed by the client computer, the first embedded command causing the client computer to display first image data of the input image and a second embedded command interpreted when the document is printed by the client computer, the second embedded command for printing second image data of the input image with a larger number of pixels than the number of pixels of the first image data of the input image, and outputting the document with the first and second embedded commands described.

(6) The digital still camera according to (5), wherein the image data output units outputs the first image data and the second image data.

(7) The digital still camera according to (5), wherein the markup language output unit describes in the document a third embedded command interpreted when the document is printed by the client computer, the third embedded command specifying a document layout, and outputs the document with the third embedded command described.

(8) The digital still camera according to (7) wherein the markup language output unit describes in the document a fourth embedded command interpreted when the document is printed by the client computer, the fourth embedded command specifying a page break, and outputs the document with the fourth embedded command described.

(9) The digital still camera according to (6) further comprising an interface being connected to a communication unit for transferring the document to the server computer through the telecommunication line.

(10) A method of interpreting a markup language by a client computer connected through a telecommunication line to a server computer, the method comprising the steps of:

interpreting a first embedded command described in a document transferred from the server computer and displaying first image data of an input image when the document is displayed; and interpreting a second embedded command described in the document and printing second image data of the input image with a larger number of pixels than the number of pixels of the first image data when the document is printed.

(11) The method according to (10), wherein the first image data is transferred from the server computer to the client computer in the step of displaying the first image data, and the second image data is transferred from the server computer to the client computer in the step of printing the second image data.

(12) The method according to (11) further comprising the step of interpreting a third embedded command described in the document and specifying a document layout when the document is printed.

(13) The method according to (12) further comprising the step of interpreting a fourth embedded command described in the document and specifying a page layout when the document is printed.

(14) A record medium storing a browser being executed in a client computer connected through a telecommunication line to a server computer, the browser for causing the client computer to execute the steps of:

interpreting a first embedded command described in a document transferred from the server computer and displaying first image data of an input image when the document is displayed; and interpreting a second embedded command described in the document and printing second image data of the input image with a larger number of pixels than the number of pixels of the first image data when the document is printed.

(15) A print system comprising a client computer connected through a telecommunication line to a server computer and a printer for receiving print data from the client computer and printing a document, the print system comprising:

a display unit for interpreting a first embedded command described in a document, described in a markup language and transferred from the server computer, and displaying first image data of an input image recorded in the server computer when the document is displayed; and a print unit for interpreting a second embedded command described in the document and printing second image data of the input image with a larger number of pixels than the number of pixels of the first image data when the document is printed.

(16) A server computer comprising:

a record unit for recording, according to a request made by a second client computer, a document described in a markup language wherein a first embedded command interpreted when the document is displayed by a first client computer, the first embedded command for causing the first client computer to display first image data of an input image, and a second embedded command interpreted when the document is printed by the first client computer, the second embedded command for printing second image data of the input image with a larger number of pixels than the number of pixels of the first image data of the input image, are described, and the image data of the input image; and a transfer unit for transferring, according to a request made by the first client computer, the document and the image data of the input image to the first client computer through a telecommunication line.

According to (1), (4) and (5), in a document transferred to a client computer through a telecommunication line from a server computer, a first embedded command interpreted when the document is displayed by the client computer, the embedded command for causing the client computer to display first image data of an input image, and a second embedded command interpreted when the document is printed by the client computer, the embedded command for printing second image data of the input image with a larger number of pixels than the number of pixels of the first image data of the input image, are described, whereby upon acceptance of a command for printing the image displayed when the document is displayed in the client computer, an image of higher quality than the quality of the displayed image can be printed in the client computer.

According to (5), a digital still camera is provided with a markup language output unit for outputting the document with the first and second embedded commands described, whereby it is made easy to transfer an image recorded with the digital still camera, etc., to the server computer installed in the telecommunication line network, request the image from the client computer, display the image in low image quality, namely, in an easy-to-view size on a display, and print the image in high image quality.

In (1), (4) and (5), the first image data and the second image data may be recorded separately in the server computer or the image data on which the first image data and the second image data are based may be previously recorded in the server computer and the first image data and the second image data may be prepared from the image data in the client computer.

According to (6), the image data output unit outputs the first image data and the second image data. When the first image data and the second image data thus output are recorded in the server computer, to display the image, small image data with low image quality may be transferred from the server computer to the client computer, making it possible to display the image at high speed. To print the image, high-quality image data can be transferred from the server computer to the client computer for printing the image in high image quality.

According to (2) and (7), a third embedded command interpreted when the document is printed by the client computer, the embedded command for specifying a document layout, is described in the document for defining the document layout at the printing time before the document is transferred to the server computer, whereby the server computer can be used as an image record unit and the image can be easily printed in a predetermined format. The document layout contains at least the size of print paper and an image layout on the print paper.

According to (3) and (8), a fourth embedded command interpreted when the document is printed by the client computer, the embedded command for specifying a page break, is described in the document and the page concept at the printing time is contained in the document, whereby one image can be prevented from being printed across sheets of record paper.

According to (9), the digital still camera is provided with an interface being connected to a communication unit for transferring the document to the server computer through the telecommunication line, whereby it is made easy to transfer the above-described document to the server computer installed in the telecommunication line network.

According to (10), (14) and (15), the first embedded command for displaying the first image data of low image quality of the input image in the client computer is interpreted and executed when the document described in a markup language is displayed, and the second embedded command for printing the second image data of high image quality of the input image is interpreted and executed when the document is printed, whereby an image of higher quality than the quality of the image displayed in the client computer can be printed. Therefore, if the image recorded with the digital still camera, etc., is recorded in the server computer installed in the telecommunication line network, it can be made easy to call the image from the client computer, display the image in low image quality, namely, in an easy-to-view size on the display, and print the image in high image quality.

In (10), (14) and (15), the first image data and the second image data may be recorded separately in the server computer or the image data on which the first image data and the second image data are based may be previously recorded in the server computer and the first image data and the second image data may be prepared from the image data in the client computer.

According to (11), to display the image, the first image data is transferred from the server computer to the client computer and to print the image, the second image data is transferred from the server computer to the client computer, whereby the image can be displayed at high speed and can be printed in high quality.

According to (12), to print the document, a third embedded command described in the document is interpreted and a document layout is specified, whereby the document can be printed according to the predefined document layout and the server computer can be used as an image record unit and the image can be easily printed in a predetermined format.

According to (13), to print the document, a fourth embedded command described in the document is interpreted and a page break is specified, whereby the page concept of the document at the printing time can be interpreted and one image can be prevented from being printed across sheets of record paper.

According to (16), a host computer records, according to a request made by a second client computer, a document described in a markup language where in the first embedded command and the second embedded command are described and the image data displayed or printed by the embedded command, and transfers, a request made by a first client computer, the document and the image data to the first client computer through a telecommunication line, whereby it is made easy to transfer an image recorded with the digital still camera, etc., to the server computer installed in the telecommunication line network, call the image from the client computer, display the image in low image quality, and print the image in high image quality.

BRIEF DESCRIPTION OF THE DRAWINGS

FIG. 8 is a drawing to show an HTML document according to the embodiment of the invention;

FIG. 9 is a drawing to show an HTML document according to the embodiment of the invention; and FIG. 10 is a drawing to show an HTML document according to the embodiment of the invention.

DETAILED DESCRIPTION OF PREFERRED EMBODIMENTS

Referring now to the accompanying drawings, there are shown preferred embodiments of the invention.

Figure 2:
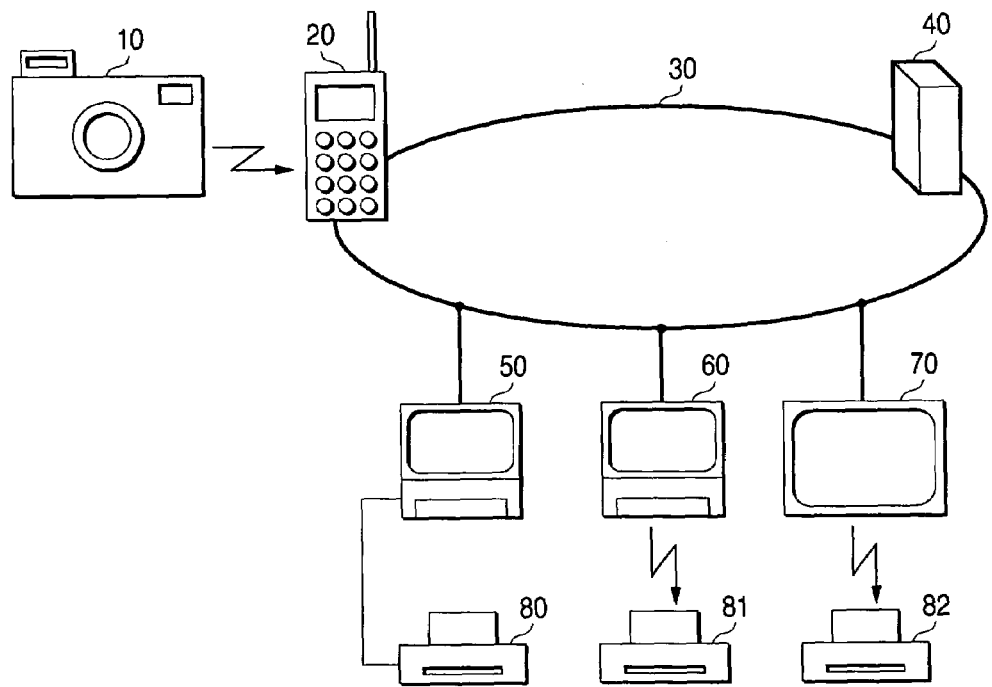
FIG. 2 is a schematic diagram to show an image handling system according to one embodiment of the invention.

FIG. 2 shows an image handling system according to an embodiment of the invention. The image handling system is constituted by a communication network 30, a mobile telephone 20, a digital still camera 10 that can be connected to the communication network 30 through the mobile telephone 20, a WWW server 40, WWW clients 50, 60, and 70, and printers 80, 81, and 82 connected to the WWW clients 50, 60, and 70, respectively.

The communication network 30 (corresponding to a telecommunication unit in the claims) is made up of a telephone network, an ISDN (integrated services digital network), a mobile data communication network, a LAN (local area network), etc. These communication networks can be handled transparently by a low-layer protocol of the Internet, and the digital still camera 10, the WWW server 40, and the WWW clients 50, 60, and 70 can communicate data with each other by executing an application program compliant with a high-layer protocol of the Internet.

The mobile telephone 20 (corresponding to a communication unit in the claims) has a radio modem built-in and can radio-communicate with the digital still camera 110 by Bluetooth. The mobile telephone 20 having a radio modem is an example as a communication unit of the digital still camera 10 and a wired modem may be used as the communication unit of the digital still camera 10.

The digital still camera 10 can transfer a file through the communication network 30 to the WWW server 40 based on FTP (File Transfer Protocol).

The WWW server 40 (corresponding to a server computer in the claims) is one of a large number of WWW servers that can be accessed by the digital still camera 10 and the WWW clients 50, 60, and 70.

Each of the WWW clients 50, 60, and 70 (corresponding to a client computer in the claims) is constituted by a computer that can execute a browser described later. The WWW clients 50, 60, and 70 are, for example, a personal computer, a video game machine, and a so-called Internet television.

The printers 80, 81, and 82 are connected to the WWW clients 50, 60, and 70, respectively, by USB, RS232C, radio based on Bluetooth, etc.

As the above-described hardware resources are used to transfer HTML documents and image data among the digital still camera 10, the WWW server 40, and the WWW clients 50, 60 and 70, the image handling system according to the embodiment makes it possible to easily print an image captured by the digital still camera 10 in high image quality regardless of the location, the time, or the WWW client hardware difference. The configuration and operation of the image handling system according to the embodiment will be discussed in detail separately in the topics of photographing and file transfer and browse and print.

Photographing and File Transfer

Figure 3:
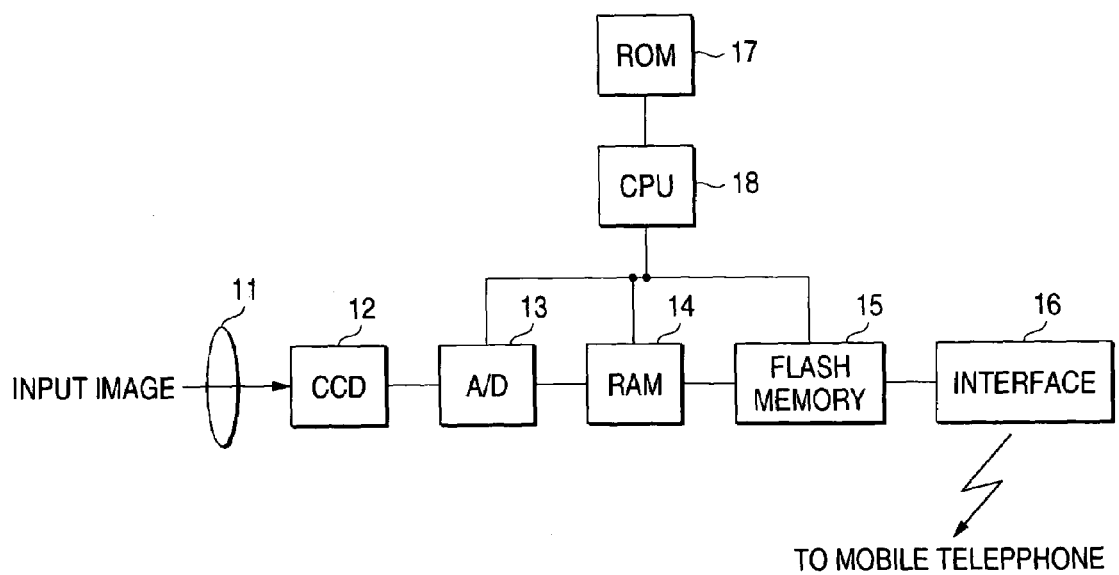
FIG. 3 is a block diagram to show a digital still camera according to the embodiment of the invention.

To photograph a subject, the digital still camera 10 shown in FIG. 3 is used. A subject is focused through a lens 11 on a CCD 12. An analog signal output from the CCD 12 is converted into a digital signal by an A/D converter 13 and the digital signal is recorded in RAM (random access memory) 14 as a buffer. The input image data recorded in the RAM 14 is processed by a CPU (central processing unit) 18 and is compressed and recorded in nonvolatile memory 15. The CPU 18 functions by executing firmware recorded in ROM (read-only memory) 17. (An output unit in the claims is constituted by the lens 11, the CCD 12, the A/D converter 13, the RAM 14, the CPU 18, and the ROM 17, and a markup language output unit in the claims is constituted by the CPU 18, the RAM 14, and the ROM 17.)

Various modifications of a manner of recording in the nonvolatile memory 15 are made possible by programming the firmware. For example, to record display image data and print image data in the WWW server, two image files different in the number of pixels are created from the input image data recorded in the RAM 14 and are recorded in the nonvolatile memory 15. To create the two image files, the image file with the smaller number of pixels corresponds to first image data and the image file with the larger number of pixels corresponds to second image data. One of the two image files is used as JPEG (Joint Photographic image coding Experts Group) image data for display and considering the size when the image file is displayed with a browser, the number of pixels is set to 320 pixels×240 pixels, for example. The other image file is used as JPEG image data for print and specification is made before photographing, whereby the number of pixels can be set to 1600 pixels×1200 pixels, for example. On the other hand, to record large image data of high image quality in the WWW server, display smaller image data of low image quality in an easy-to-view size by the function of the browser, and print the large image data of high image quality, one image file may be created from the input image data recorded in the RAM 14. It is desirable to previously define a photograph mode assuming that an image file is recorded in the WWW server and automatically create an image file with a specific number of pixels in the photograph mode.

The digital still camera 10 has an HTML document preparation function and a file transfer function compliant with the FTP in order to display image data by the browser and print the image data. It is desirable that a user interface should be provided for enabling the user to easily use the functions following a guide screen displayed on an LCD.

Figure 4:
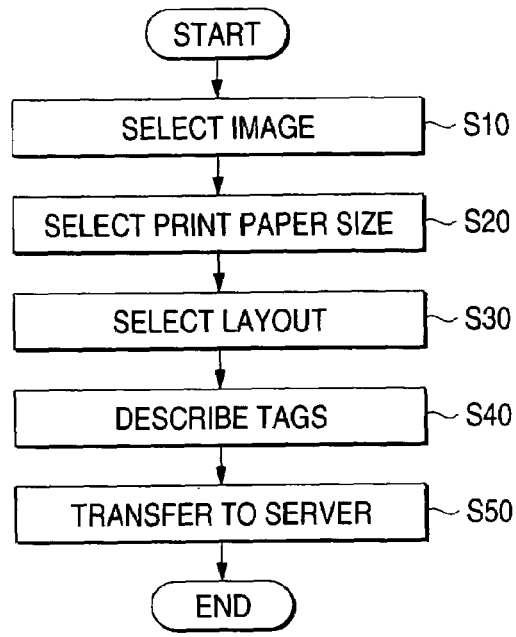
FIG. 4 is a flowchart of a markup language edit program according to the embodiment of the invention.

An example of means for implementing the HTML document preparation function and the file transfer function compliant with the FTP will be discussed. The HTML document preparation function and the file transfer function compliant with the FTP can be implemented by a markup language edit program executed by pressing, by the user, a specific switch provided on the cabinet of the digital still camera 10. FIG. 4 is a flowchart of such a program.

Figure 5:
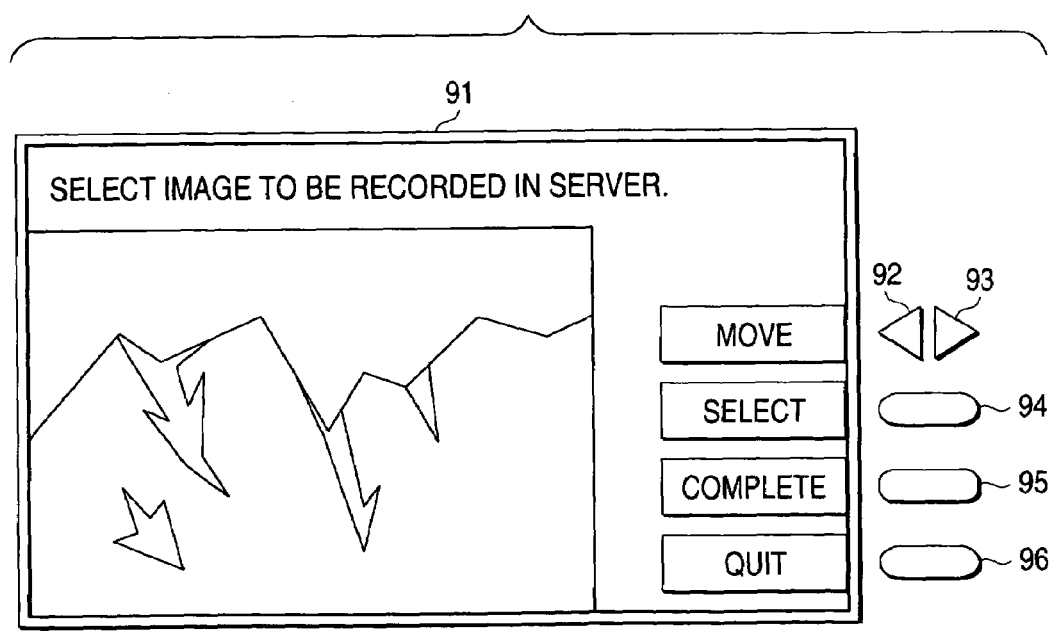
FIG. 5 is a schematic diagram to describe the execution process of the markup language edit program according to the embodiment of the invention.

At S10, the user is requested to select an input image to be recorded in the WWW server from among the input images recorded in the nonvolatile memory 15. For example, a guide screen shown in FIG. 5 is displayed on an LCD 91 placed on the cabinet and the user can select the image by key input. In the example shown in FIG. 5, the functions of keys 92 to 96 are displayed on the guide screen of the LCD 91. As the user presses the move key 92, 93, the input image displayed on the LCD 91 (in FIG. 5, mountain scenery) is changed and when the user presses the selection key 94, the input image displayed on the LCD 91 is selected as the input image to be recorded in the WWW server. As the user presses the completion key, one or more input images to be recorded in the WWW server are set.

Figure 6:
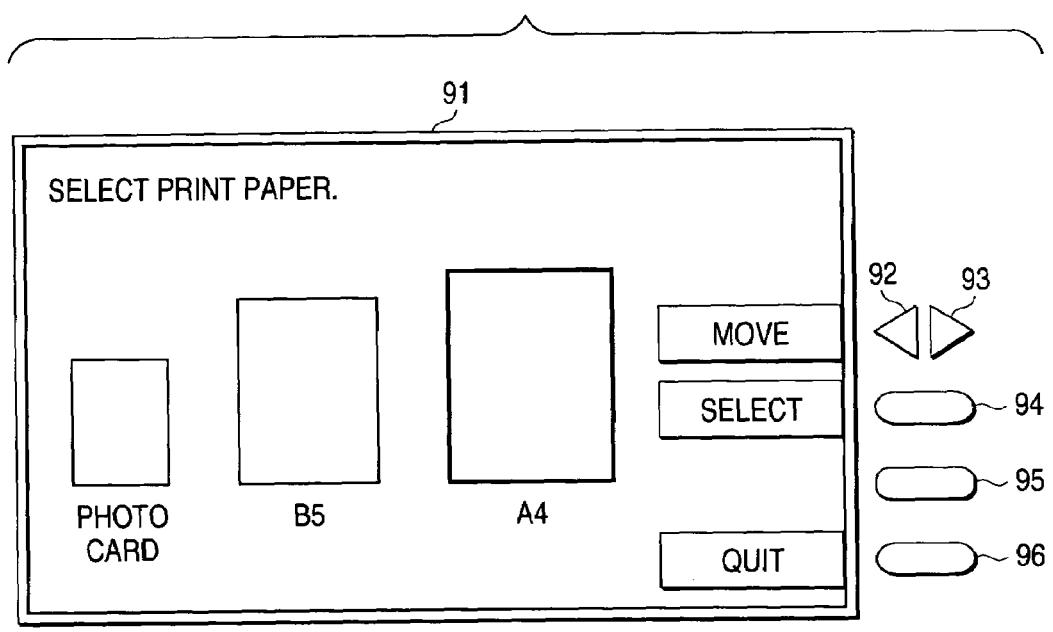
FIG. 6 is a schematic diagram to describe the execution process of the markup language edit program according to the embodiment of the invention.

At S20, the user is requested to select the size of print paper (B5, A4, etc.,) to be used to print the image file recorded in the WWW server by the browser. For example, a guide screen shown in FIG. 6 is displayed on the LCD 91 and the user selects the print paper size by operating the move key 92, 93 and sets the selected print paper size by pressing the selection key 94.

Figure 7:
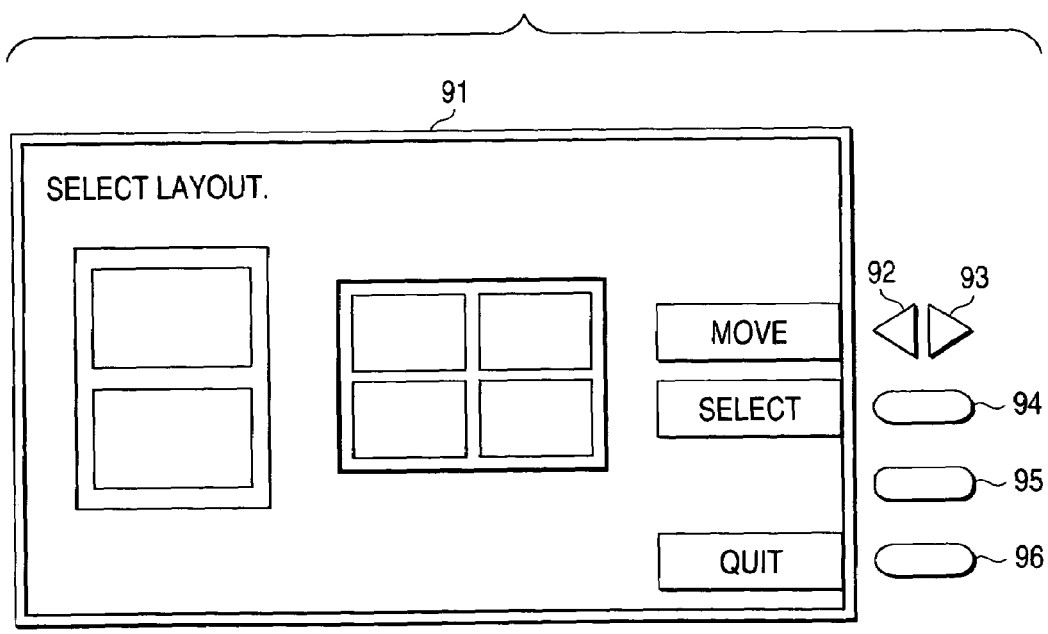
FIG. 7 is a schematic diagram to describe the execution process of the markup language edit program according to the embodiment of the invention.

At S30, the user is requested to select an image layout to print the image data recorded in the WWW server by the browser. For example, a guide screen shown in FIG. 7 is displayed on the LCD 91 and the user selects the image layout by operating the move key 92, 93 and sets the selected image layout by pressing the selection key 94.

At S40, tags are described for preparing an HTML document in accordance with the input image, the print paper size, and the image layout set at S10 to S30. For example, two image files different in the number of pixels are specified by a tag per input image selected at S10. One is a display image file and the other is a print image file. For example, at step S10, the user can be requested to enter the image number in a volume contents table of the nonvolatile memory 15. By using the image number as a search key, two image files can be specified for one image and a tag can be described. Of course, in this case, two image files created from one subject (input image) need to be registered for the image number in the volume contents table. For example, tags defining a table can be described for setting the image layout. FIG. 8 shows an example of tags for displaying four images A to D and laying out the four images A to D with A4-sized print paper horizontally oriented at the printing time.

<print_paper_size=A4,rotate> on the third line (corresponding to a third embedded command in the accompanying claims) is a tag which orders, at the time of printing, the browser to print the image with horizontally orienting A4-sized print paper. This tag is interpreted only at the printing time and is ignored at the display time. The fifth line to twenty-second line provide tags for specifying displaying and printing an image file in a table form for the browser (corresponding to the third embedded command in the claims). <TABLE BORDER=1 BGCOLOR="#FFFF" WIDTH=2500> on the fifth line is a tag for specifying the ruled line thickness, the background color, and the table (array) width for the browser. In the example shown in FIG. 8, WIDTH=2500 is interpreted as the same meaning at the display time and the printing time; however, the table (array)

width may be changed at the display time and the printing time, for example, as WIDTH=(DPS=xxxxxx, PRN=yyyyyy). This also applies to the ruled line thickness and the background color.

<img SRC=(DSP="photoA1.jpg",PRN="photoA2") on the eighth line (corresponding to a first embedded command and a second embedded command in the claims) is a tag for specifying displaying a file named photoA1.jpg when HTML document is displayed and printing a file named photoA2.jpg when HTML document is printed for the browser. In tags of <img SRC=(DSP="xx1.jpg",PRN=xx2.jpg")> on the eighth, eleventh, sixteenth, and nineteenth lines, files named xx1.jpg and xx2.jpg denote two image files different in the number of pixels created for one subject. The file corresponding to xx1.jpg is a file with a smaller number of pixels, such as 320 pixels X240 pixels, and the file corresponding to xx2.jpg is a file with a larger number of pixels, such as 1600 pixels×1200 pixels.

In the tags shown on the eighth, eleventh, sixteenth, and nineteenth lines in FIG. 8, two image files for display and print are specified for one image; however, as in tags shown on the eighth, eleventh, sixteenth, and nineteenth lines in FIG. 9, one image file may be specified for one image and display image data and print image data may be prepared by the browser from the print image file. Tags shown in FIG. 9 are used to create one image file from one image at the photographing time.

It is desirable that HTML document should be provided with page concept at the printing time as in tags shown in FIG. 10. <SHEETFEED> on the twenty-fourth line specifies form feed before and after <SHEETFEED> (corresponding to a fourth embedded command in the claims).

At S50, the HTML document prepared at step S40 and the image file specified in the tag are transferred to the WWW server based on an ftp command. To transfer the HTML document and the image file, the address of the WWW server, the file recording location, the provider, and the like need to be preset. They may be able to be set with the single unit of the digital still camera 10 or the digital still camera 10 can be connected to a personal computer for inputting the setup items from the personal computer. Of course, the digital still camera 10 and the mobile telephone 20 must be connected at the transferring time. Using the ftp command, the HTML document and the image file specified in the tag are transferred from a Bluetooth interface 16 of the digital still camera 10 through the radio modem of the mobile telephone 20 to the WWW server 40. Upon reception of the ftp command, the WWW server 40 records the HTML document and the image file specified in the tag at predetermined addresses of a record unit. (The record unit of the WWW server corresponds to a record unit in the accompanying claims.)

Browse and Print

Figure 1:
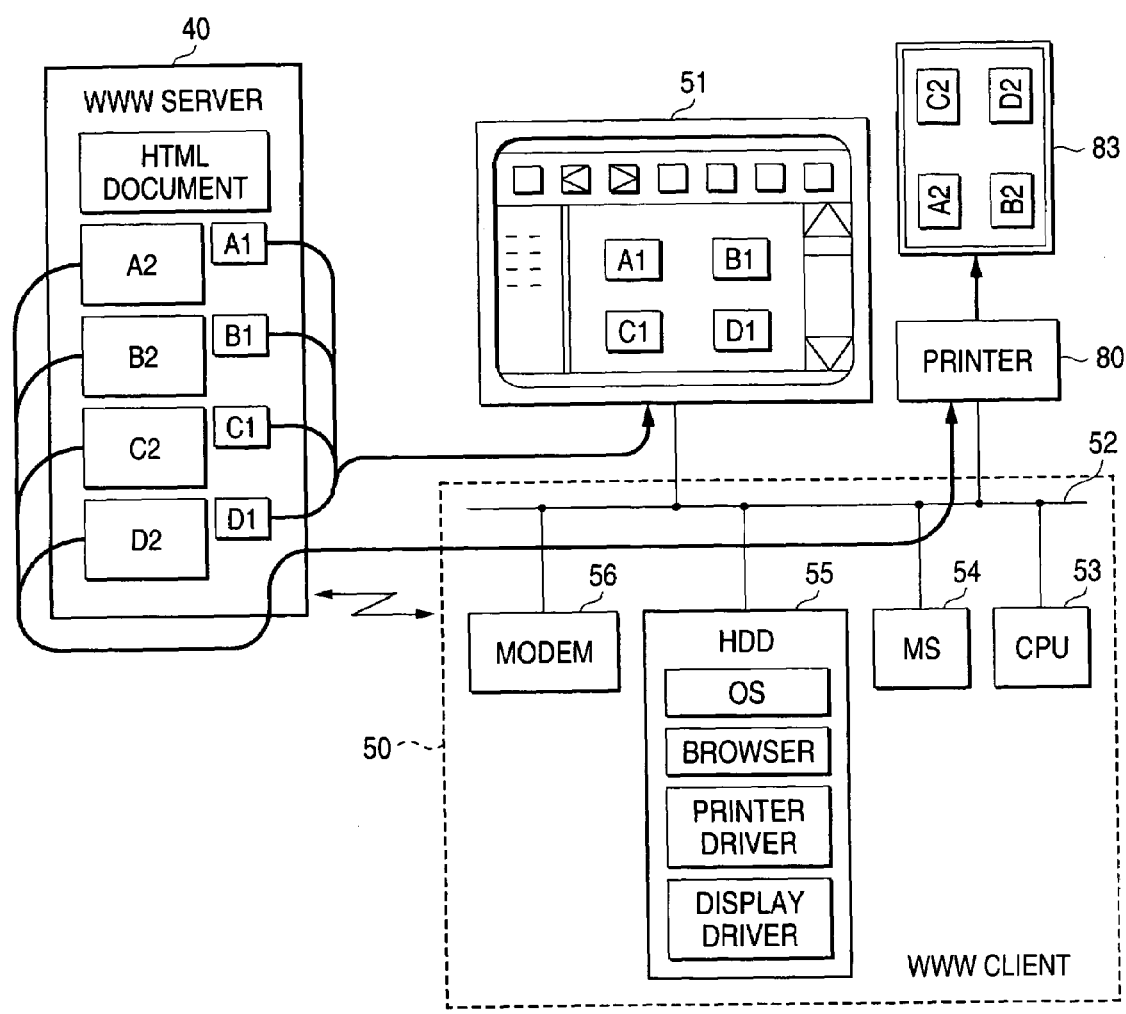
FIG. 1 is a block diagram to show a WWW server and a WWW client according to one embodiment of the invention.

Browsing an HTML document, namely, displaying an image file, and printing an HTML document, namely, printing an image file are executed using a personal computer shown in FIG. 1, for example. As the WWW client, not only a personal computer, but also a video game machine, etc., having a browsing function can be used as described above; here the configuration using the personal computer for browsing will be discussed.

Programs such as the operating system (OS), browser, printer driver, and display driver are stored on a hard disk drive (HDD) 55. A CPU 53 temporarily stores the programs in a main storage (MS) 54 and executes the programs for causing a WWW client 50 to function. A modem 56 is a unit for communicating data with a WWW server 40 through a communication network. A display 51 is controlled by the display driver and receives data recorded in the MS 54 through the OS from the browser and displays the data. A printer 80 receives data recorded in the MS 54 through the OS and the printer driver from the browser and prints the data. (A display unit in the claims is constituted by the display 51, the CPU 53 and the MS 54, and a print unit in the claims is constituted by the printer 80, the CPU 53, and the MS 54.)

An HTML document recorded in the WWW server 40 is transferred from the WWW server 40 to the WWW client 50 as the path name of URL is transmitted as a request from the browser to the WWW server 40 based on the HTTP (Hypertext Transfer Protocol). Upon reception of the path name of URL as the request from the WWW client 50, as a response to the request, the WWW server 40 takes out the HTML document from the address of the storage unit corresponding to the path name and transmits the HTML document to the WWW client 50. Generally, a proxy server intervenes between the WWW server 40 and the WWW client 50 and the storage unit of the proxy server is used as a cache. That is, if the data specified by the WWW client 50 exists in the proxy server, the data recorded in the proxy server is transferred to the WWW client 50. The image data specified in a tag of the HTML document is transferred from the WWW server 40 or the proxy server to the WWW client 50 like the HTML document.

The image data specified in the tag of the HTML document is determined as the browser interprets the HTML document, and the browser transmits a request for transferring the determined image data to the WWW server 40 and receives the image data.

To display the HTML document on the display 51, the browser interprets only the display tags and ignores the print tags. For example, to display the HTML document made up of the tags shown in FIG. 8, the browser ignores the third line and also ignores PRN="photoX2" on the ninth, eleventh, sixteenth, and nineteenth lines. Therefore, to interpret the tags shown in FIG. 8 and display the HTML document, the browser transmits a request for transferring only four image files of photoA1.jpg, photoB1.jpg, photoc1.jpg, and photoD1.jpg to the WWW server 40 and does not transmit a request for transferring four image files of photoA2.jpg, photoB2.jpg, photoC2.jpg, and photoD2.jpg. Therefore, to display the HTML document made up of the tags shown in FIG. 8, the four image files of photoA1.jpg, photoB1.jpg, photoc1.jpg, and photoD1.jpg are stored in the MS 54 and are displayed on the display 51. The image files of photoA1.jpg, photoB1.jpg, photoc1.jpg, and photoD1.jpg are small image files each with 320 pixels×240 pixels and thus can be transferred in a short time and can be displayed at high speed. The image files are displayed in an array consisting of tow columns and tow rows in the table form specified in the tag. Of course, when the image files are displayed on the display 51, necessary data is passed from the browser through the OS to the display driver.

To display the HTML document made up of the tags shown in FIG. 9, the browser ignores the third line, interprets DSP=16% and ignores PRN=100% on the ninth, eleventh, sixteenth and nineteenth lines. That is, the browser interprets <img SRC="photoX.jpg" (DSP=16%)> on the ninth, eleventh, sixteenth, and nineteenth lines, transmits a request for transferring image file of photoX.jpg to the WWW server 40, and stores the image file in the MS 54. The browser reduces the image file stored in the MS 54 to 16%, passes the image file through the OS to the display driver, and displays the reduced image data on the display.

To print an HTML document, the browser interprets the tags used for print and if display and print tags are described side by side, the browser ignores the display tags and interprets the print tags. For example, in the tags on the ninth, eleventh, sixteenth, and nineteenth lines shown in FIG. 8, at the printing time, DSP="photoX1.jpg" is ignored and PRN="photoX2.jpg" is interpreted. Therefore, for example, when the user clicks on a print button displayed on the display 51 by the browser, the browser transmits a request for transferring four image files of photoA2.jpg, photoB2.jpg, photoC2.jpg, and photoD2.jpg to the WWW server 40. Upon reception of the image files specified in the print tags, the browser transmits a print request to the OS and passes the image files to the printer driver together with the necessary parameters for specifying the print paper size and the layout specified in the tags on the third line and the fifth to twenty-first lines. The printer driver uses the data of the images, the print paper size, and the layout received through the OS to prepare image data and transmits the print data to the printer 80. The printer 80 prints images based on the print data. Each of the image files photoA2.jpg, photoB2.jpg, photoC2.jpg, and photoD2.jpg is a high-quality image file with 1600 pixels×1200 pixels and thus high-quality images can be printed on the printer 80.

To print the HTML document made up of the tags shown in FIG. 9, the browser interprets PRN=100% on the ninth, eleventh, sixteenth, and nineteenth lines and ignores DSP=16%. Therefore, for example, when the user clicks on the print button displayed on the display 51 by the browser, the browser transmits a request for printing the image files already stored in the MS 54 to the OS and passes the image files to the printer driver together with the necessary parameters for specifying the print paper size and the layout specified in the tags on the third line and the fifth to twenty-first lines.

If the page concept at the printing time is described as in the HTML document shown in FIG. 10, the page concept is reflected on print. To print the HTML document shown in FIG. 10, the browser interprets <SHEET FEED> on the twenty-fourth line and thus transmits a print request to the OS and the printer driver so as to prepare one-page print data from the tags described on the lines of up to the twenty-third line and one-page image data from the tags described on the twenty-fifth line and the later lines.

The browser may be provided with a function of inquiring about the size of print paper set on the printer 80 based on the tag interpreted at the printing time and displaying an error message if print paper of the size specified in the tag is not set. For example, the browser interprets the third line of the HTML document shown in FIG. 8 and inquires of the printer driver whether or not A4-sized print paper is set on the printer 80, whereby the browser can keep track of the size of print paper set on the printer 80, so that it can display an error message in response to a reply from the printer driver. Thus, a print error can be prevented from occurring.

In the described embodiment, as the means for preparing an HTML document and transferring the HTML document to the WWW server, the digital still camera 10 has been taken by way of example; however, a personal computer may be used as the means, of course. For example, the personal computer connected to the communication network 30 may execute an application wherein after an image file is created from an input image through a digital still camera, a scanner, etc., an HTML document for displaying and printing the image file is prepared and is transferred to the WWW server.

What is claimed is:

1. A printing system, comprising:
   a communicating unit, operable to receive a print document which includes a first link for specifying a display image file and a second link for specifying a print image file and is described in a markup language, and operable to receive the display image file and the print image file;
   a displaying unit, operable to display the print document received by the communicating unit;
   a printing unit, operable to print the print document received by the communicating unit;
   a print instruction receiving unit, operable to receive a print instruction from a user; and
   a markup language interpreting unit, operable to interpret the second link and to ignore the first link when the print instruction receiving unit receives the print instruction, and operable to interpret the first link and to ignore the second link when the print instruction receiving unit does not receive the print instruction, wherein
   the print image file and the display image file express the same image and are independent from each other, and
   the print image file has a larger number of pixels than the number of pixels of the display image file.

2. The printing system according to claim 1, wherein the print instruction receiving unit receives the print instruction by clicking on a print button displayed on the displaying unit.

3. The printing system according to claim 1, wherein the print document includes print layout information, and the print layout information is displayed on the displaying unit.

4. The printing system according to claim 1, wherein the print document includes print sheet size information for specifying a print sheet size, and the printing unit prints the print document with the print sheet size.

5. A printing system, comprising:
   an internet television, comprising:
   a communicating unit, operable to receive a print document which includes a first link for specifying a display image file and a second link for specifying a print image file and is described in a markup language, and operable to receive the display image file based on the first link;
   a displaying unit, operable to display the print document received by the communicating unit;
   a first print instruction receiving unit, operable to receive a first print instruction from a user;
   a markup language interpreting unit, operable to interpret the first link and to ignore the second link when the first print instruction receiving unit does not receive the first print instruction; and
   a print instruction transmitting unit, operable to transmit a second print instruction when the first print instruction receiving unit receives the first print instruction; and
   a printer, comprising:
   a second print instruction receiving unit, operable to receive the second print instruction transmitted by the print instruction transmitting unit; and
   a printing unit, operable to print the print document based on the second link in response to the second print instruction.

6. The printing system according to claim 5, wherein the first print instruction receiving unit receives the first print instruction by clicking on a print button displayed on the displaying unit.

7. The printing system according to claim 5, wherein the markup language interpreting unit interprets the second link and ignores the first link when the print instruction transmitting unit transmits the second print instruction to the second print instruction receiving unit, the communicating unit receives the print image file based on the second link, the internet television further comprises a print data generating unit, operable to generate print data based on the print image file, the print instruction transmitting unit transmits the print data and the second print instruction to the second print instruction receiving unit, and the printing unit prints the print document based on the print data.

8. The printing system according to claim 5, wherein the print document includes print layout information, and the print layout information is displayed on the displaying unit.

9. The printing system according to claim 5, wherein the print document includes print sheet size information for specifying a print sheet size, and the printing unit prints the print document with the print sheet size.

10. The printing system according to claim 5, wherein the print image file and the display image file express the same image and are independent from each other, and the print image file has a larger number of pixels than the number of pixels of the display image file.

11. A printing system comprising:

a communicating unit, operable to receive a print document which includes a first link for specifying a display image file and a second link for specifying a print image file and is described in a markup language, and operable to receive the display image file and the print image file;

a print unit, operable to print the print document received by the communicating unit;

a print instruction receiving unit, operable to receive a print instruction from a user; and a markup language interpreting unit, operable to interpret the second link and to ignore the first link when the print instruction receiving unit receives the print instruction; wherein:

the print image file and the display image file express the same image and are independent from each other, and the print image file has a large number of pixels than the number of pixels of the display image file.

12. An internet television, comprising:

a communicating unit, operable to receive a print document which includes a first link for specifying a display image file and a second link for specifying a print image file and is described in a markup language, and operable to receive the display image file based on the first link;

a displaying unit, operable to display the print document received by the communicating unit;

a first print instruction receiving unit, operable to receive a first print instruction from a user;

a markup language interpreting unit, operable to interpret the first link and to ignore the second link when the first print instruction receiving unit does not receive the first print instruction; and a print instruction transmitting unit, operable to transmit a second print instruction when the first print instruction receiving unit receives the first print instruction.

13. A printer control unit, comprising:

a communicating unit, operable to receive a print document which includes a first link for specifying a display image file and a second link for specifying a print image file and is described in a markup language, and operable to receive the display image file and the print image file;

a print instruction receiving unit, operable to receive a print instruction from a user; and a markup language interpreting unit, operable to interpret the second link and to ignore the first link when the print instruction receiving unit receives the print instruction; wherein:

the print image file and the display image file express the same image, and the print image file has a large number of pixels than the number of pixels of the display image file.

14. A printer control unit, comprising:

a communicating unit, operable to receive a print document which includes a first command for specifying a display image file and a second command for specifying a print image file and is described in a markup language, and operable to receive the display image file and the print image file;

a print instruction receiving unit, operable to receive a print instruction from a user; and a markup language interpreting unit, operable to interpret the second command and to ignore the first command when the print instruction receiving unit receives the print instruction;

wherein:

the print image file and the display image file express the same image, and the print image file has a large number of pixels than the number of pixels of the display image file.

* * * * *